(12) United States Patent
Tsai

(10) Patent No.: US 8,259,137 B2
(45) Date of Patent: Sep. 4, 2012

(54) ELECTRONIC DEVICE AND METHOD OF BROWSING IMAGES IN A LOOP

(75) Inventor: Teng-Yu Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 279 days.

(21) Appl. No.: 12/687,029

(22) Filed: Jan. 13, 2010

(65) Prior Publication Data

US 2011/0134149 A1 Jun. 9, 2011

(30) Foreign Application Priority Data

Dec. 7, 2009 (CN) .......................... 2009 1 0311019

(51) Int. Cl.
*G09G 5/00* (2006.01)
(52) U.S. Cl. ......... 345/684; 345/619; 345/672; 345/682
(58) Field of Classification Search .................. 345/684, 345/638, 173, 687, 619, 672, 682; 715/748, 715/764, 784
See application file for complete search history.

(56) References Cited

U.S. PATENT DOCUMENTS

| | | | |
|---|---|---|---|
| 6,266,069 B1 * | 7/2001 | Thagard et al. | 345/638 |
| 7,155,679 B2 * | 12/2006 | Bandaru et al. | 715/748 |
| 2011/0169757 A1 * | 7/2011 | Kiddle et al. | 345/173 |

* cited by examiner

*Primary Examiner* — Chante Harrison
(74) *Attorney, Agent, or Firm* — Altis Law Group, Inc.

(57) ABSTRACT

A method of browsing images in a loop on an electronic device includes displaying a scroll interface. The scroll interface defines coordinates with a scale in pixels by a display. An initial coordinate value is located at a middle portion of the scroll interface. The scroll interface defines 2F index views. The index views have at least one row, and an interval of two adjacent index views is defined as S. Each index view has an index number. The display displays G images. The index number corresponds to the image number. The scroll interface is moved along a first direction. The scroll interface is adjusted by M, a natural number, multiplied by S pixels to reposition the display for being adjacent to the initial coordinate value, and the display displays images with the image numbers corresponding to the index numbers from X to X+G−1.

4 Claims, 7 Drawing Sheets

| 1 | 2 | 3 | 4 | ••• | 8 | 9 | 10 | Image number |
|---|---|---|---|-----|---|---|----|--------------|
| 1 | 2 | 3 | 4 | ••• | 8 | 9 | 10 | Index number |

FIG. 3

| 3 | 4 | 5 | ••• | 10 | 11 | 12 | Image number |
| 3 | 4 | 5 | ••• | 10 | 11 | 12 | Index number |

FIG. 6

ELECTRONIC DEVICE AND METHOD OF BROWSING IMAGES IN A LOOP

BACKGROUND

1. Technical Field

The present disclosure relates to electronic devices, and particularly to an electronic device and a method of browsing images in a loop on the electronic device.

2. Description of Related Art

Embedded electronic devices (such as digital photo frames) allow browsing of images by contacting the display. However, images can only be browsed from a beginning point to an end point of the collection. If an image arranged far from the current viewing position is to be displayed, long and tedious manipulation of the touch screen is required. The operation is not convenient for the user.

BRIEF DESCRIPTION OF THE DRAWINGS

FIG. 3 is a schematic view of a memory block of an electronic device.

FIG. 6 is a schematic view of the memory block after the scroll interface moves.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
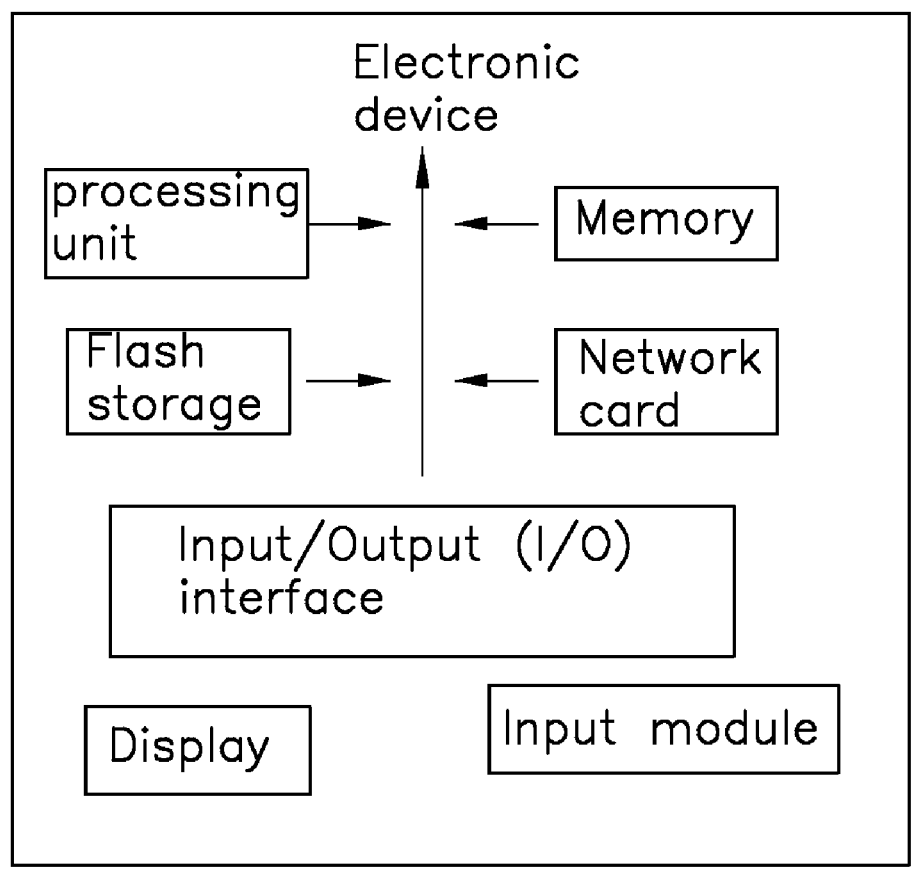
FIG. 1 shows an electronic device in accordance with one embodiment.

Referring to FIG. 1, an electronic device includes a processing unit, a memory, a flash storage, an Input/Output (I/O) interface, a network card, a display and an input module. The display displays a user interface. The input module may be a remote controller. The electronic device may be a digital photo frame, a media player, or a personal computer.

Figure 2:
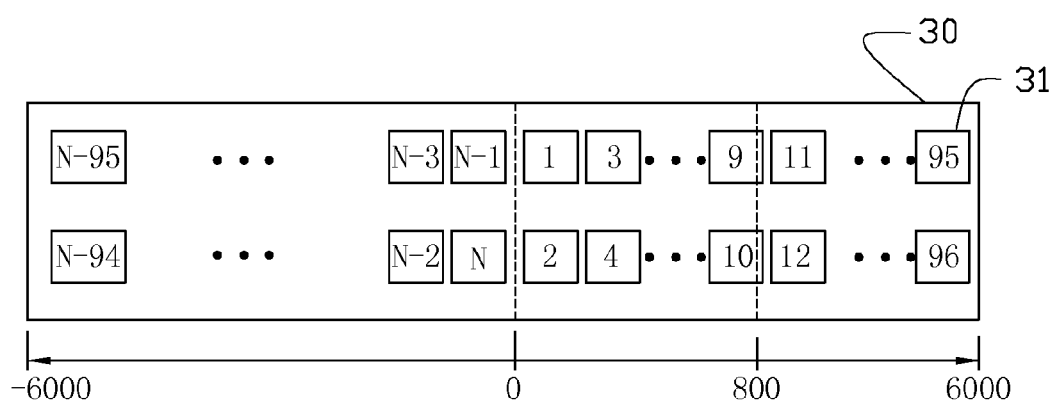
FIG. 2 is a schematic view of a scroll interface of an electronic device.
Figure 4:
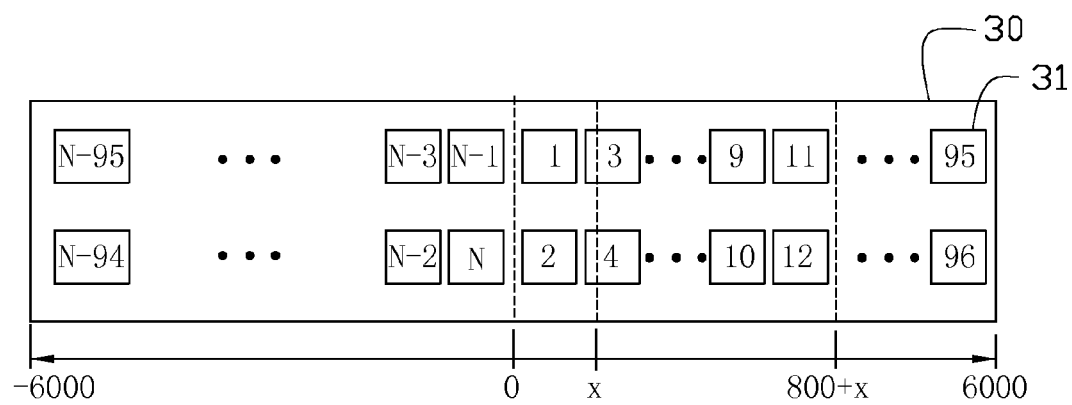
FIG. 4 is a schematic view of the scroll interface moving.

Referring to FIG. 2, the electronic device includes an initializing module, a computing module and a location module. The initializing module establishes a scroll interface 30. The scroll interface 30 defines coordinates with a scale in pixels. The display is located at a middle portion of the scroll interface 30 corresponding to an initial coordinate value 0. The scroll interface 30 defines 2F of the same index views 31. The F of the same index views 31 is defined in two sides of the initial coordinate value. The index views 31 show at least one row. In one embodiment, the scroll interface 30 is defined from −6000 pixels to 6000 pixels and has 192 index views 31, that is F=96. Each index view 31 has an index number.

The index views 31 have B rows. An interval of two adjacent index views 31 is defined as S pixels. The display displays G index views 31. In one embodiment, B=2, G=10, S=150.

The index number is defined as X. The display displays index views 31 with index numbers from X to X+G−1. The index numbers increase from 1 towards a first direction, and decrease from N towards a second direction opposite to the first direction. The flash storage stores N images. Image numbers may be defined from 1 to N. The index number corresponds to the image number. In one embodiment, a width of the display is 800 pixels.

Referring to FIG. 3, the initializing module initializes G groups of memory blocks. Each group includes two memory units. One memory unit stores the index numbers from X to X+G−1. Another memory unit stores the corresponding images. The memory is capable of temporarily storing the images and the index numbers displaying on the display. The flash storage stores all the images and the index numbers like a hard disk. When the display is about to displaying some images, the images are decoded in the flash storage and transferred to the memory for displaying. The flash storage stores the index numbers without displaying. In one embodiment, G=10.

Referring to FIG. 4, FIG. 5, FIG. 6 and FIG. 7, one embodiment of a method of browsing images in a loop by an electronic device includes the following blocks.

In block S40, the scroll interface moves along the first direction. The scroll interface 30 is slid x pixels.

Figure 5:
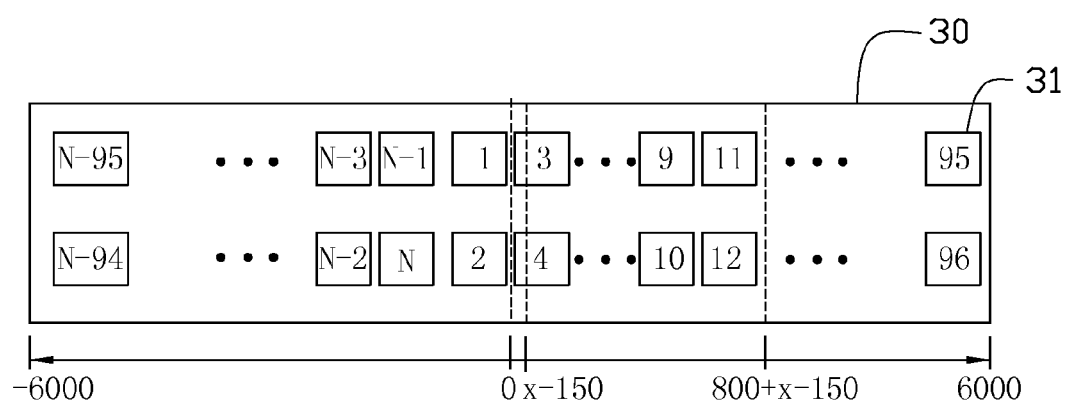
FIG. 5 is a schematic view of a selection being made from the scroll interface.
Figure 7:
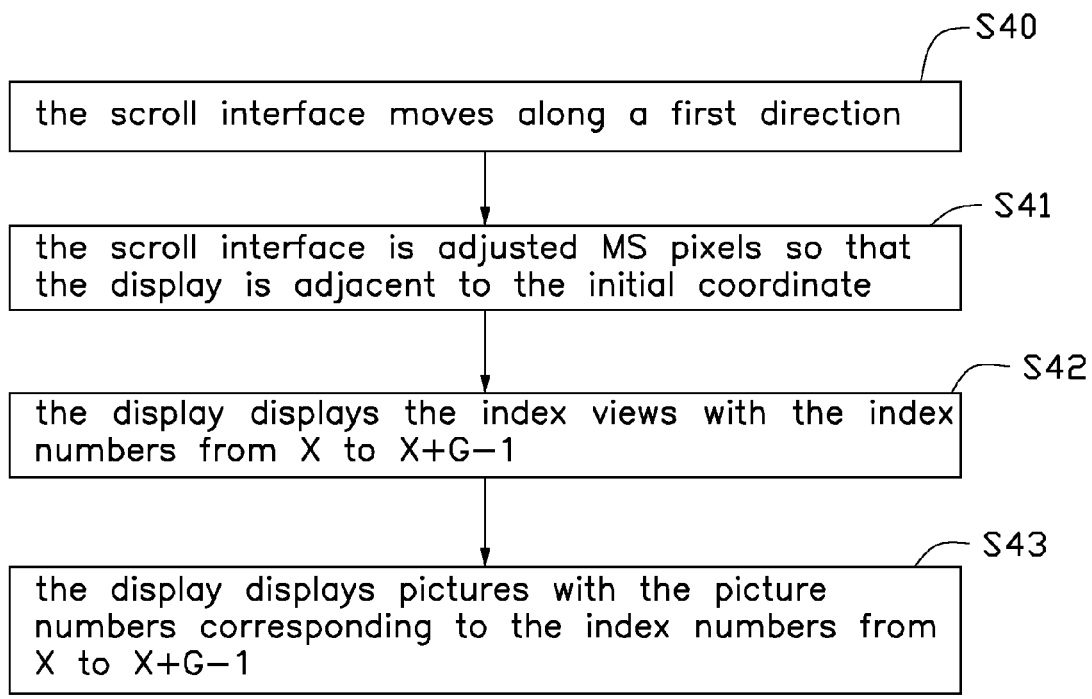
FIG. 7 is a flowchart of a method of browsing images in a loop on an electronic device, such as, for example, that of FIG. 1.

In block S41, the scroll interface 30 is adjusted M multiplied by S (M is a natural number) pixels along the second direction converse to the first direction so that the display is adjacent to the initial coordinate value. Z coordinate of the display is defined after the scroll interface is adjusted, and Z is located between the initial coordinate and S. For example, as shown in FIG. 5, M=1, S=150. The display is close to the initial coordinate value. The display may not arrive at the edge of the scroll interface 30 because the scroll interface 30 is adjusted by MS pixels. The electronic device displays the images in a loop.

In block S42, the display displays index views 31 with index numbers from X to X+G−1. When N≧F, the index views have B (B is a natural number) rows. The index numbers increase from 1 to F toward the second direction. The index numbers increase from 1+BM to F+BM toward the second direction after the scroll interface 30 is adjusted.

When N≧F, the index views have B (B is a natural number) rows. The index numbers decrease from N to N−F toward the first direction. The index numbers decrease from N−BM to N−F−BM toward the first direction after the scroll interface is adjusted.

When B≧2, the index numbers are vertically arranged by increasing magnitude, and then horizontally arranged by increasing magnitude toward the second direction. When N≦F, the index views correspond to the images arranged in a loop.

In block S43, the display displays images with the image numbers corresponding to the index numbers from X to X+G−1. In one embodiment, the display displays 10 images, and X=3. Thus, the index numbers 11 and 12 correspond to the image numbers 1 and 2.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method of browsing images in a loop on an electronic device, the method comprising:
    displaying a scroll interface, wherein the scroll interface defines coordinates with a scale in pixels by a display, an initial coordinate value is located at a middle portion of the scroll interface, the scroll interface defines 2F index views, the index views have at least one row, an interval of two adjacent index views is defined as S, each index view has an index number, the display displays G images, each image having an image number, all the image numbers are defined from 1 to N, and the index number corresponds to the image number;
    moving the scroll interface along a first direction, the display displaying the index views with the index numbers from X to X+G−1;
    adjusting the scroll interface by M, a natural number, multiplied by S pixels to reposition the display for being adjacent to the initial coordinate value so that the images are displayed in the loop;
    displaying the images with the image numbers corresponding to the index numbers from X to X+G−1 on the display;
    wherein the display displays the index views having the index numbers from X to X+G−1 when the index numbers of all the index views are redefined; when N ≧F, the index views have B rows, the index numbers are defined from 1 to F toward a second direction opposite to the first direction; and the index numbers are defined from 1+BM to F+BM toward the second direction after the scroll interface is adjusted.

2. A method of browsing images in a loop on an electronic device, the method comprising:
    displaying a scroll interface, wherein the scroll interface defines coordinates with a scale in pixels by a display, an initial coordinate value is located at a middle portion of the scroll interface, the scroll interface defines 2F index views, the index views have at least one row, an interval of two adjacent index views is defined as S, each index view has an index number, the display displays G images, each image having an image number, all the image numbers are defined from 1 to N, and the index number corresponds to the image number;
    moving the scroll interface along a first direction, the display displaying the index views with the index numbers from X to X+G−1;
    adjusting the scroll interface by M, a natural number, multiplied by S pixels to reposition the display for being adjacent to the initial coordinate value so that the images are displayed in the loop;
    displaying the images with the image numbers corresponding to the index numbers from X to X+G−1 on the display;
    wherein the display displays the index views having the index numbers from X to X+G−1 when the index numbers of all the index views are redefined; when N ≧F, the index views have B rows, B is a natural number, the index numbers are defined from N to N−F towards the first direction; and the index numbers are defined from N−BM to N−F−BM towards the first direction after the scroll interface is adjusted.

3. The method of claim 2, wherein when B ≧2, the index numbers increase from top down in a first order, and the index numbers are horizontally arranged by increasing magnitude toward the second direction in a second order.

4. An electronic device capable of browsing images in a loop, the electronic device comprising:
    a display capable of displaying a scroll interface, the scroll interface defining coordinates with a scale in pixels, an initial coordinate value located at a middle portion of the scroll interface, the scroll interface defining 2F same index views, the index views having at least one row, the index views being horizontally spaced at intervals, an interval of two adjacent index views being defined as S, each index view having an index number, the display capable of displaying G images;
    a storage capable of storing N images, image numbers defined from 1 to N, the index number corresponding to the image number;
    wherein the scroll interface is capable of moving along a first direction, the display is capable of displaying the index views with the index numbers from X to X+G−1, the scroll interface is capable of being adjusted by M, a natural number, multiplied by S pixels so that the display is adjacent to the initial coordinate value, the display is capable of displaying the images with the image numbers corresponding to the index numbers from X to X+G−1;
    wherein the display is capable of displaying the index views having the index numbers from X to X+G−1 when the index numbers of all the index views are redefined; when N ≧F, the index views have natural number B rows, the index numbers are defined from 1 to F toward a second direction, that is opposite to the first direction; and the index numbers are defined from 1+BM to F+BM toward the second direction after the scroll interface is adjusted.

* * * * *